United States Patent [19]

Yananton

[11] Patent Number: 4,756,273
[45] Date of Patent: Jul. 12, 1988

[54] REVERSIBLE BAG FOR USE WITH LITTER PAD

[76] Inventor: Patrick Yananton, 1518 Little Hill Rd., Point Pleasant, N.J. 08742

[21] Appl. No.: 870,351

[22] Filed: Jun. 4, 1986

Related U.S. Application Data

[63] Continuation-in-part of Ser. No. 573,958, Jan. 26, 1984, Pat. No. 4,640,225, which is a continuation-in-part of Ser. No. 315,307, Oct. 27, 1981, Pat. No. 4,469,046, which is a continuation-in-part of Ser. No. 909,256, May 24, 1978, abandoned.

[51] Int. Cl.[4] ............................................... A01K 1/00
[52] U.S. Cl. ........................................................ 119/1
[58] Field of Search ............................ 119/1; 220/403

[56] References Cited

U.S. PATENT DOCUMENTS

| 3,227,137 | 1/1966 | Goldman et al. | 119/1 |
| 3,284,273 | 11/1966 | Prentice | 119/1 |
| 3,521,624 | 7/1970 | Gander et al. | 119/1 |
| 3,735,735 | 5/1973 | Noroian | 119/1 |
| 4,047,499 | 9/1977 | Janecek | 119/1 |
| 4,136,798 | 1/1979 | Oberstein | 220/403 |
| 4,279,217 | 7/1981 | Behringer | 119/1 |
| 4,469,046 | 9/1984 | Yananton | 119/1 |
| 4,640,225 | 2/1987 | Yananton | 119/1 |
| 4,646,685 | 3/1987 | Arenz | 119/1 |

FOREIGN PATENT DOCUMENTS 2100581  1/1983  United Kingdom ............... 220/403

OTHER PUBLICATIONS

Tidy Cat 3 Cat Box Liners, 1986.

Primary Examiner—David A. Scherbel
Assistant Examiner—Caroline D. Dennison
Attorney, Agent, or Firm—Sheldon H. Parker

[57] ABSTRACT

A disposable animal litter pad is combined with a moisture impermeable bag for easy disposal. The litter pad includes a sorbent pad laminate for the collection of animal urine and a top claw resistant screen made of a urine permeable, flexible member of material substantially inert to urine. The disposable animal litter pad laminate has a bottom layer of two sheets of moisture impermeable material peripherally sealed together along three sides to form a bag like structure. The sorbent pad laminate also includes a sorbent layer of material, positioned adjacent the moisture impermeable material, and having a high sorbtion capacity for urine. Disposal is accomplished by reversing the bag over the litter pad, thereby enclosing the litter pad, along with the animal waste and litter and facilitating disposal.

18 Claims, 4 Drawing Sheets

REVERSIBLE BAG FOR USE WITH LITTER PAD

CROSS REFERENCE TO RELATED APPLICATION

This application is a continuation-in-part of patent application Ser. No. 573,958, filed Jan. 26, 1984, now U.S. Pat. No. 4,640,225 which application is a continuation-in-part of application Ser. No. 06/315,307 filed Oct. 27, 1981, now U.S. Pat. No. 4,469,046 issued Sept. 4, 1984 and which was a continuation-in-part of application Ser. No. 05/909,256, filed May 24, 1978, now abandoned, the subject matter and description of which is incorporated herein by reference thereto, as though set forth herein in detail.

BACKGROUND OF THE INVENTION

1. Field of the Invention

This invention relates to improvements in a unique odor preventing, disposable, absorbent pad-liner system for an animal litter unit, and more particularly to an improved combination of mesh screening and absorbent padding with a bag like plastic liner to be utilized in combination with a customized or standard litter box.

2. Brief Description of the Prior Art

Many domestic animals frequently use litter boxes for the elimination of body wastes. The boxes are usually filled with various kinds of absorbent granular materials such as sand, cat litter and the like, and must be periodically emptied and cleaned, which are somewhat objectionable tasks, since the absorbent granular material must be replaced and the boxes cleaned each time.

Cats, being the most frequent users of litter boxes, present a further problem in that the urine of the feline contains the highest content of urea which, when allowed to stand for any length of time in any litter material, releases an ammonia odor. This odor is one of the more objectionable factors in the ownership of a cat.

In order to eliminate the odor caused by cat urine, the litter box must be changed frequently, this being an expensive, laborious and unpleasant job.

Many patents have issued on devices for the indoor use by cats, such as U.S. Pat. No. 3,233,588. The invention disclosed in this patent employs the use of a screen which is placed on top of the cat litter. This patent does ease the problem of animal excrement, by merely lifting the screen and disposing of the feces lying on top, it does not however, contend with the problem of the odor created by the urine. The unit must be periodically emptied of its absorbent granules and thus only partly contents with the elimination of the mess and labor involved. U.S. Pat. No. 3,809,013 is similar, except that a stack of liners is placed under the litter. When the litter becomes soiled, the liner is lifted, the litter filters through screen covered holes in the center of the liner and the litter is reused with the next liner. Again, the excrement is disposed of neatly, however the odor problem remains.

U.S. Pat. No. 3,284,273 discloses an absorbent pad which can be used in combination with animals. Although this pad does contain absorbent capabilities, the odor from the urine of the animal is trapped, much as in the standard cat litter. The pad is not designed for repetitive, long term use in a cat box but rather to retain the urine in a disposable pad, by mopping up pools of urine left on floors or in cages, etc.

U.S. Pat. No. 3,476,083 discloses the use of deodorizing substances which are placed in the bottom of the receptacle. A screen is placed a short distance above, on which lies the standard kitty litter. The upper compartment receives the solid and liquid excreta, retains the solids and absorbs the bulk of the liquid allowing the excess liquids to drain through to the lower compartment. Although providing some neutralizing of the ammonia odor by deodorizing the urine which cannot be absorbed by the litter, it does not provide an effective means for deodorizing the bulk of the urine which has been trapped in the litter. The disposal of all the litter creates a substantial expense to the owner and the cleaning of the lower compartment would be unpleasantly laborious and rather messy. The spilling of the deodorizing substances (lime is suggested) would be objectionable as well as possibly harmful to the person handling the container if by chance some of the chemical substance was to come in contact with the skin.

U.S. Pat. No. 3,752,121, Brazzell, discloses a tray which holds a absorbent mat covered with artificial grass. "Below the artificial grass 31 and its backing sheet 32 there is provided a liquid absorbing pad 33 which may be composed of a plurality of layers of absorbent paper and/or a pad of absorbant fibers to absorb any liquid which seeps through the apertures in the artificial grass backing sheet." The Brazzell patent also recommends using a deodorizer after the animal has used the unit (deodorizer included with the unit at time of purchase). The purpose of the Brazzell absorbant layers is to hold the urine, encasing it between a bottom "impervious layer" and a top "nonabsorbant or impervious layer" of artificial grass. The trapment of the urine allows for bacteria to grow, causing odor. This bacteria growth prevents use of the pad for long periods of time.

While many additional patents could be cited regarding other variations of disposal systems, types of granular litter and containers none of these patents overcome both the problem of odor and easy, economical and convenient disposal and replacement.

SUMMARY OF THE INVENTION

In the instant invention the foregoing problems are overcome and an easy to use, odorless, absorbent pad with easy disposal through the use of a moisture impermeable bag and sorbent pad laminate for the collection of animal urine. Two sheets of moisture impermeable material are sealed together along a substantial portion of their periphery to form a bag like structure. A middle layer of material, having a high sorbtion capacity for urine, is positioned between the moisture impermeable material and a claw resistant screen means. The screen is a liquid permeable, flexible member of material substantially inert to urine, formed of strands having sufficient tear strength to withstand the clawing action of a cat and sufficiently small hole size to protect underlying layers from being torn by claws. One of the sheets of moisture impermeable material and the claw resistant screen are bonded to each other along at least a substantial portion of the peripheral edges of the screen means.

BRIEF DESCRIPTION OF THE DRAWINGS

The advantages and objects of the invention will become apparent and the invention will be more fully understood from the following specification, particularly when read in conjunction with the drawing wherein.

DETAILED DESCRIPTION OF THE INVENTION

Figure 1:
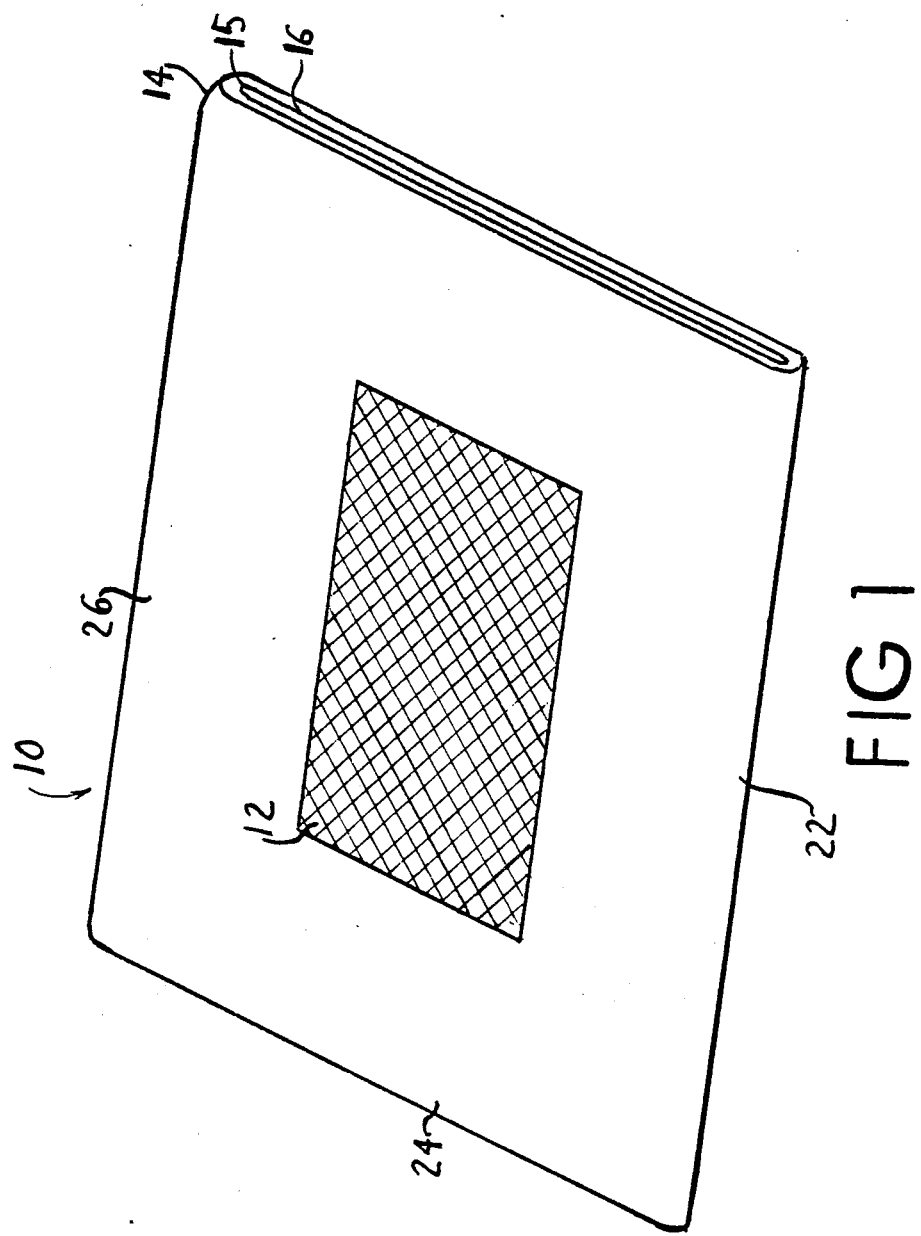
FIG. 1 is a top perspective of the reversible pad unit in accordance with the present invention.

In order to provide a clear understanding of the instant invention, the various aspects of the invention are hereinafter described in detail.

GRANULAR MATERIAL 20

The granular material as employed in the instant invention is utilized to satisfy the digging instinct of the animal and therefore need not provide absorptive qualities. Consequently, inexpensive materials, such as clay, can be used in accordance with individual preferences. Unlike the commonly employed systems in which the granular material must be used in quantity to provide the required absorptive qualities and digging qualities, minimal quantities of the granular material can be used, as described herein. The absorption quality of the layer can provide the total or the predominant desiccation effect.

The litter material is commonly in granular form and must be in moisture transfer contact with the underlying absorbent material so that the urine can be drawn from the litter material into the sorptive layers. The use of a surfactant on the screen material can enhance the moisture transfer capability of the screen and is essential in combination with hydrophobic or low hydrophilicity materials. The particle size distribution can range between 5.6 to 1 mm, corresponding to U.S. Series Standard Sieve opening #3½ to #18. Smaller particles exist within the litter down to the size of dust, but do not adversely effect the primary function of the particles or adversely effect the absorptive material. Transport of the liquid across the screen can actually be enhanced by the presence of the small particles which are aesthetically undesirable but functionally acceptable.

ABSORBENT UNIT 12

The absorptive elements can be any material such as paper, tissue, pulp starch and related polymers, etc. which can disperse the liquid quickly, thus providing a large surface area for evaporation of moisture. In order to maintain a moisture free environment, it is necessary to evaporate from 5 to 20 ml. of liquid each time the system is used by the cat.

Examples of absorbent materials are those manufactured by Dow Chemical and marketed under U.S. Pat. No. 4,117,184. The instant patent application incorporates by reference thereto, as though set forth in detail herein the description in U.S. Pat. No. 4,117,184 of a product commonly identified as a super absorbent and sold by Dow Chemical Company under the designation DWAL 35 R. The Dow Chemical product is available as a laminate which includes at least a tissue layer and a polymer film layer. The Dow Chemical laminate has an indicated minimum liquid absorbency capacity of 28 grams per gram of laminate.

Alternatively, the super absorbent can be a material such as the National Starch and Chemical Corporation product sold under the registered trademark PERMASORB. The National Starch product is a hydrophilic polymer which has the ability to absorb and hold urine. There is a significant reduction in urine odor and pH level in the presence of PERMASORB.

Another example of an absorbent is the material sold under the trademark WATER-LOCK by Grain Processing Corp.

The preferred material is a ground paper pulp absorptive material. It has been found to provide a combination of high absorbency, high surface area and low cost. The large surface area provides for rapid urine evaporation and consequently is extremely effective in odor prevention.

Toxic chemicals or biologically active ingredients are not only unnecessary but preferably are avoided. U.S. Pat. No. 4,494,482 assigned to Proctor and Gamble relies on the use of 5000 to 30,000 ppm of a halogenated aromatic hydrocarbon bacteriostat in an absorbent pad to effectively control odor development. It has been found that if the sorbent material has the ability to absorb the urine, distribute the urine rapidly throughout its mass, and evaporate the urine faster than the bacteria can act on the urine, then the additives are not only unnecessary but undesirable, because of the potential hazard to the animal, humans who come into contact with either the material or the animals and the hazard to the environment.

Bacteria from the feces cannot grow in the absorptive layer because they are dried out and die or become dormant. It is the bacteria which is capable of breaking down the urine which cause the strong volatile odor commonly associated with cat litter boxes, the dry environment of the sorbant material effectively prevents odor. The high absorption capacity of the super absorbant polymers, such as available from Dow Chemical, do not provide an advantage over a pulp fiber, due to the high rate of evaporation of urine from the fiberous material. In fact, the retention of moisture in the high absorbency material is less desirable than the complete evaporation of moisture from the fibrous material. As previously stated, the instant invention requires substantially less granular material for each use and requires fewer changes, saving further on granular use. In the prior art type of litter box, the litter consumption is greater than in accordance with the present invention.

| | Ordinary Litter Box | System of the Invention |
| --- | --- | --- |
| GRANULAR MATERIAL CONSUMPTION (POUNDS PER MONTH) | | |
| 1 cat | 40 | 2 to 4 |
| 2 cats | 60 | 2 to 6 |
| 3–5 cats | 80 to 100 | 20 |
| TIME PERIOD FOR CHANGING THE LITTER GRANULES (Number of changes per month) | | |
| 1 cat | 15 | 1 to 2 |
| 2 cats | 15 to 18 | 1 to 2 |
| 3–5 cats | 30 | 4 |

The amount of litter which is used can be decreased with time in order to permit the cat to become accustomed to the low litter level. In some cases, cats can be trained to the pads without litter. Whereas, in conventional litter boxes, two to three inches of litter are required, in accordance with the present invention less than one inch of litter, and preferably no more than about one half inch, provides the desired results.

SCREEN MATERIALS

A flexible, screen like mesh or permeable or semipermeable membrane is utilized to prevent the animal from clawing through to the absorbent layer. The screen material must, therefore, exhibit sufficient strength to withstand the clawing action of the animal. Even though the screen is disposable, it is critical that the screen be made of a material which is relatively inert to urine thereby preventing rapid corrosion of the screen material, resultant odors and chemical activity. Some of the preferred materials of construction include polyester and polypropylene. Particularly in the case of hydrophobic materials, a surfactant must be used to prevent the screen from acting as a liquid transfer barrier. While the particular surfactant which is used is not narrowly critical, by way of illustration the surfactant can be a non-ionic surfactant such as Tergitol. The mesh-like screen or netting 19 can be formed by the spun bonding process as well known in the art. While it would appear that screens formed by this process would not be capable of providing the required claw rip resistance without resorting to such a high material density that moisture transfer would be either precluded or severely restricted and cost would be excessive, it has been found that a critical balance of properties can be achieved.

When wovens are used, the required tensile strength in lbs./sq.in., must be at least 20 and can be as high as 150 or more in both the warp (length) and filling direction for rip resistance. From the stand point of the manufacture of the screen-absorptive layer combination, a minimum warp strength of 20 is also required. The preferred minimum strength is at least 50. The thread size preferably ranges from 30 to 80 denier.

The mesh count, in number of squares per square inch, can range between 850 and 175. At the upper limit, the hole size is so small as to interfere with liquid transfer. At the lower limit, the hole size is so large that the protective ability becomes inadequate. The lower plastic liner must be protected from the cats claws since even pin holes can cause urine to seep under the liner and causing a severe odor problem. Similarly the absorptive layer must be protected from the tearing action of the claws. For example, the screen of Vander Wall, U.S. Pat. No. 3,476,083, would be totally inoperative to prevent tearing of the absorptive layer or the plastic moisture barrier.

The use of a loose screen-like fabric is unacceptable because the mesh can be varied as a result of the force of the animal's claws. Accordingly, the reference to mesh size is intended to indicate the effective size under actual use conditions rather than a 'temporary' size which can be readily altered by the animal.

Nonwovens, as applicable to the instant application, must meet specific standards in the following areas: abrasion resistance, air permeability, burst strength, tear strength, repellency, and chemical and environmental resistance.

The fabric used in the instant invention requires a high abrasion resistance to avoid the fabric from pilling or wearing thin in certain sections. The criteria of the bursting strength and tear strength are important to prevent ripping. The pressure exerted by an animal, especially by a cat, can put stress on the fabric in diagonal, horizontal and vertical directions simultaneously. If the protective screen is torn, the animal has access to the urine filled absorbent layer. The absorbent layer must be allowed to dry out and the bacteria should be aerated to the maximum extent. Thus, the air permeability of the fabric is critical as air is required to prevent the accumulation of liquid urine and its odor, through evaporation and the maintenance of an aerobic environment. The liquid repellency of the fabric allows all the urine to pass through the fabric onto the absorbent layer and prevents the urine from being absorbed into the fabric. The chemical and bacteria, etc. repellency of the fabric prevents the corrosion of the fabric by the urine as well as bacteria build up within the fabrics.

The weight per mil of fabric is an important factor to regulate in order to prevent the fabric from adding unnecessary weight and cost to the litter pad unit. However it is an indication of the fabric strength and cannot be compromised in an effort to reduce weight of the unit. The minimum thickness would be about 2.5 mils, with a maximum requirement of about 7 mils. The preferred weight would be between 80 and 170 grams per square yard, the mil to gram ratio would naturally vary depending upon the fabric or screening used.

The process used to form the nonwoven can be any of the known processes, such as dry formed, wet formed, melt blown, thermal bonded, etc. however the spunbonded and spunlaced tend to come closest to meeting the criteria of the instant invention. Detailed information on nonwovens is disclosed in a co-pending application.

Structural integrity of the screen can be achieved by any of the known means which yields bonding of the strands at their interstices, as for example, through fusion of strands at the cross-over points or through the weaving or knitting of the strands or any other means which precludes relative movement of the strands.

FIG. 1 illustrates the reversible bag unit 10 as it would be used within its litter container. The reversible bag unit 10 can used in standard litter boxes or disposable boxes or can be locked into the custom litter box as disclosed in U.S. Pat. No. 4,469,046 and co-pending application Ser. No. 573,958. When used in either standard or disposable boxes, the impermeable plastic liner 14 will require means to affix itself to the box. The use of tapes for the purpose is disclosed in a co-pending application and can be utilized with the instant application in any of the various means disclosed therein.

The protective screen 12 is dimensioned smaller than the impermeable plastic liner 14 and should be approximately the size of the bottom of a litter box. The impermeable plastic liner 14 is formed as a plastic bag with sealed sides and one open end. The sides of the bag can be sealed by any means known in the art, however the use of toxic adhesives are to be eliminated. When the absorbent pad requires replacing, the open end 15 is turned upward, in the direction indicated by arrow 18, exposing impermeable plastic liner inside top 14a. The protective screen 12 is turned over onto itself as the impermeable plastic liner inside top 14a is turned further. The impermeable plastic liner inside 16 can be simultaneously turned in the direction of arrow 20.

Figure 3:
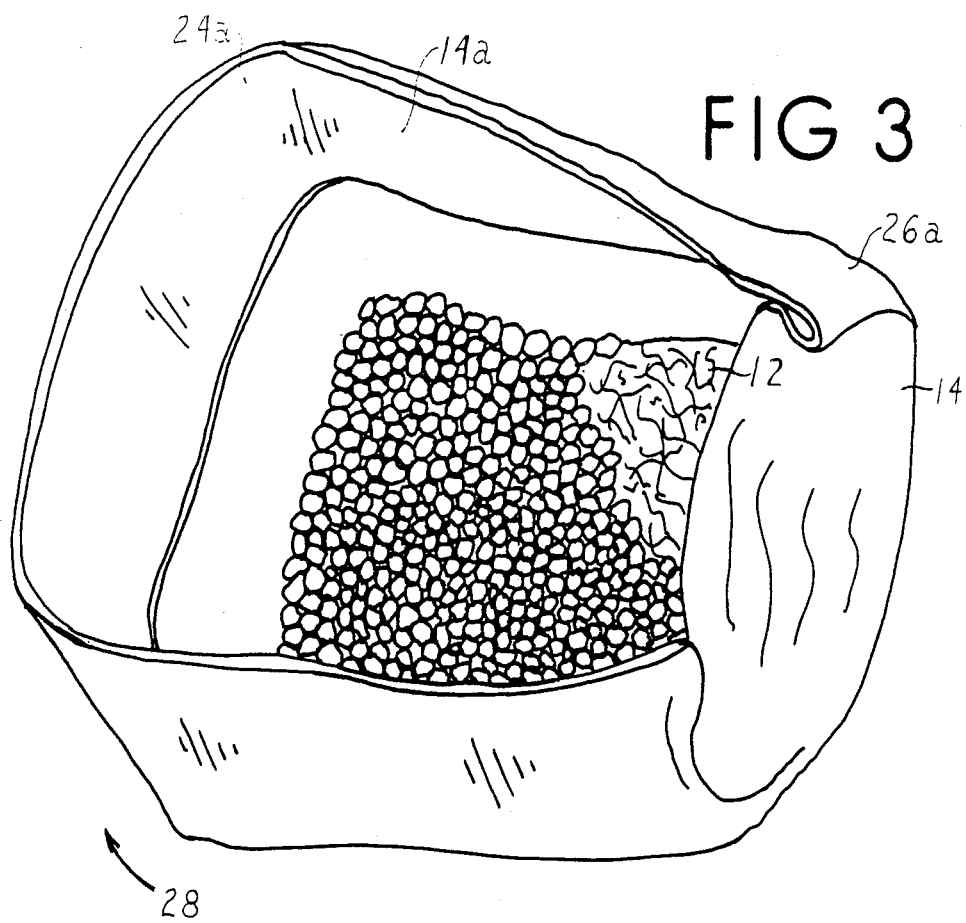
FIG. 3 a perspective view of the reversible pad unit of FIG. 1 being reversed.
Figure 2:
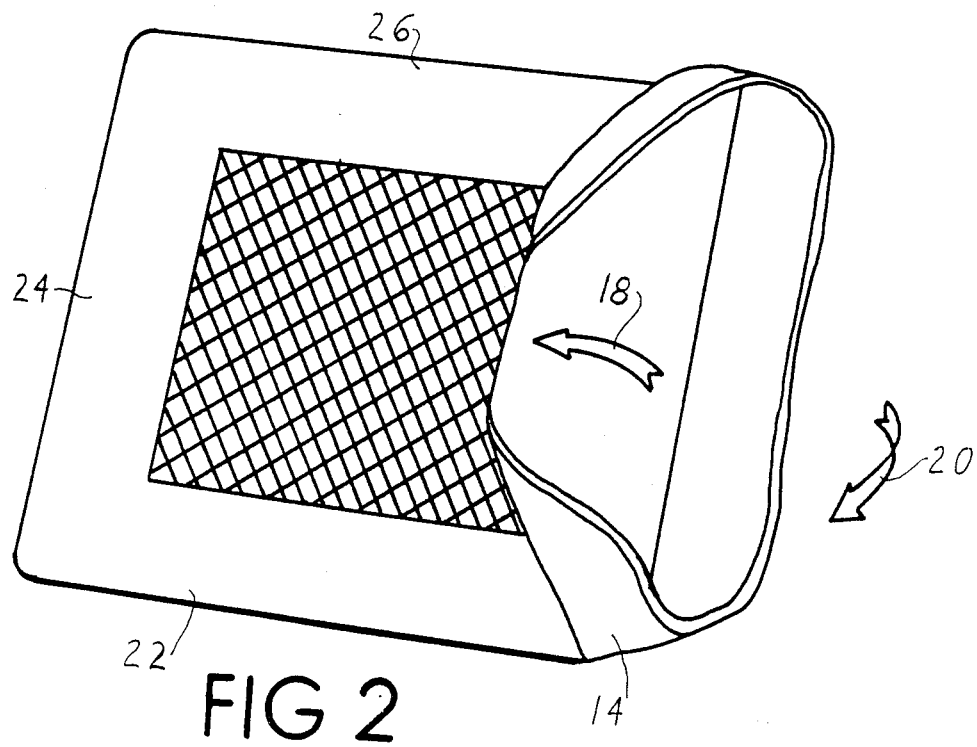
FIG. 2 is a perspective view of the reversible pad unit of FIG. 1 starting to be reversed.
Figure 4:
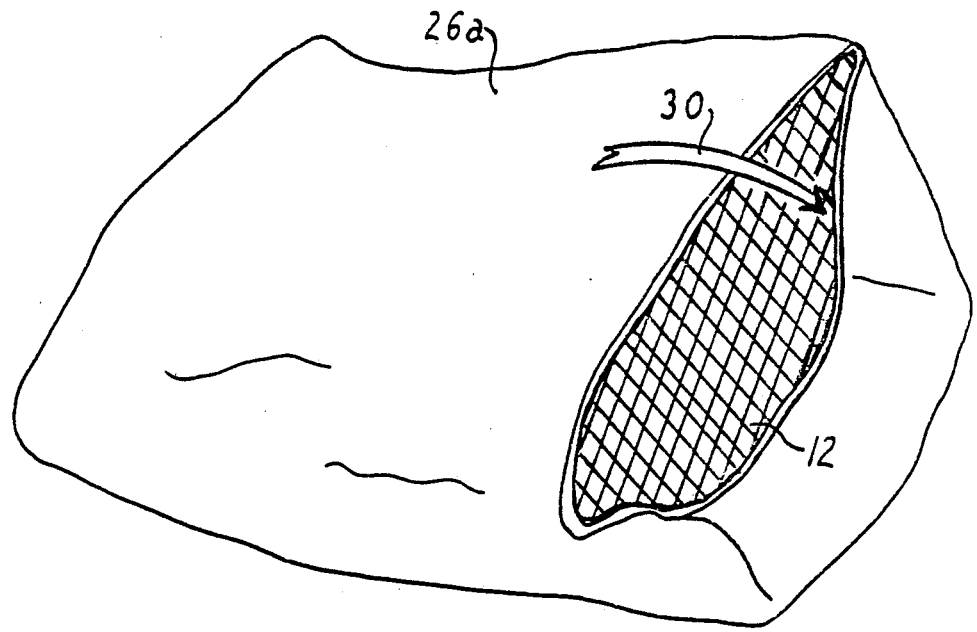
FIG. 4 is a perspective view of the reversible pad unit of FIG. 1 reversed.
Figure 5:
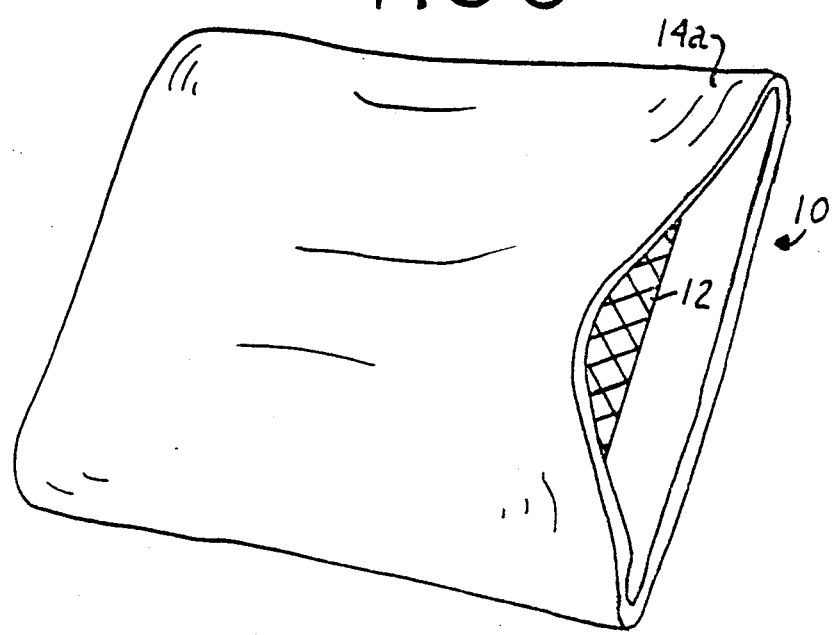
FIG. 5 is a perspective view of the reversible pad unit of FIG. 1 ready for closure.

The reversible bag unit 10 of FIG. 3 is in an almost completely reversed position. The impermeable plastic liner inside top 14a is nearly covering the screen protective screen 12. In FIG. 4 the reversible bag unit 10 is completely reversed with the impermeable plastic liner inside top 14a visually replacing the impermeable plastic liner 14. The protective screen 12 is seen on the inside of the reversible bag unit 10. The impermeable plastic liner inside top 14a is continued in the direction indicated by arrow 30 to completely close the reversible bag unit 10. FIG. 5 shows the reversible bag unit 10 ready for closing and disposal. The protective screen 12 and its litter is now sealed within the reversible bag unit 10.

It is obvious that there are several ways the reversible bag unit 10 can be reversed, sealing the contents within. Only one procedure has been described here as it is believed that only the concept need be disclosed and not the exact procedures.

Figure 6:
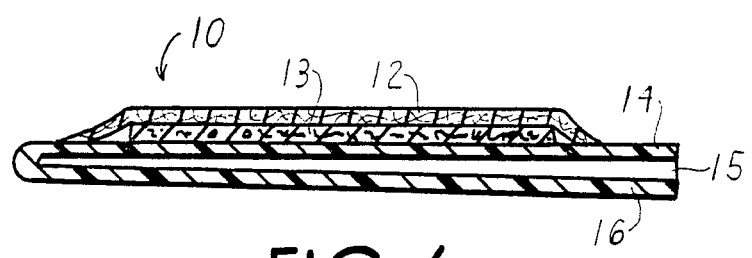
FIG. 6 is a cutaway side view of the reversible pad unit.

FIG. 6, through use of a cross section, illustrates the layering of the reversible bag unit 10. The protective screen 12 is sealed to the impermeable plastic liner 14, covering the absorbent pad 13 and protecting it and the impermeable plastic liner 14 from the claws of the animal. The bag like construction can be seen here with the open end 15 at one side allowing access.

Figure 7:
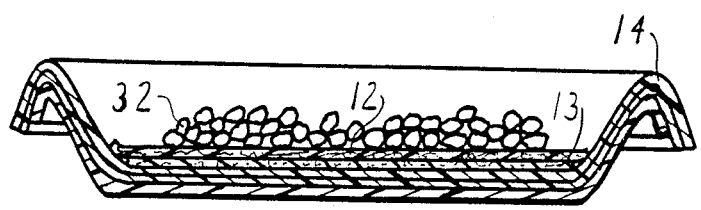
FIG. 7 is a cutaway side view of the reversible pad unit as used in a litter box.

The protective screen 12 can be sealed to the impermeable plastic liner 14 by means previously described in the parent application. As in the parent application, the criteria for the materials must be exact for the combination to work properly. In a properly balanced pad unit, the impermeable plastic liner 14 is protected by the protective screen 12, preventing puncturing and leakage of urine through the reversible bag unit 10. It should be noted that the prevention of the puncturing of the moisture impermeable member is enhanced by the use of the double layer bag since the effective thickness of the moisture impermeable member is greater in a bag than in a single layer liner. In those instances where the two layers are not sealed together by the property known as blocking, the effective thickness of the moisture impermeable member is not increased, but the slippage between the two layers of the bag makes it more difficult for a cat to puncture or tear the moisture impermeable member. In FIG. 7 the reversible bag unit 10 is used in a litter box. The sizing differential can be seen here wherein the impermeable plastic liner 14 is substantially larger than the protective screen 12 and absorbent pad 13. The impermeable plastic liner 14 should be large enough to fit over the sides of the litter box, while for economic reasons the protective screen 12 and absorbent pad 13 need only be approximately the size of the bottom of the litter box. As previously described, the litter 32 is placed on top of the protective screen 12 to provide the digging action required by cats.

Figure 8:
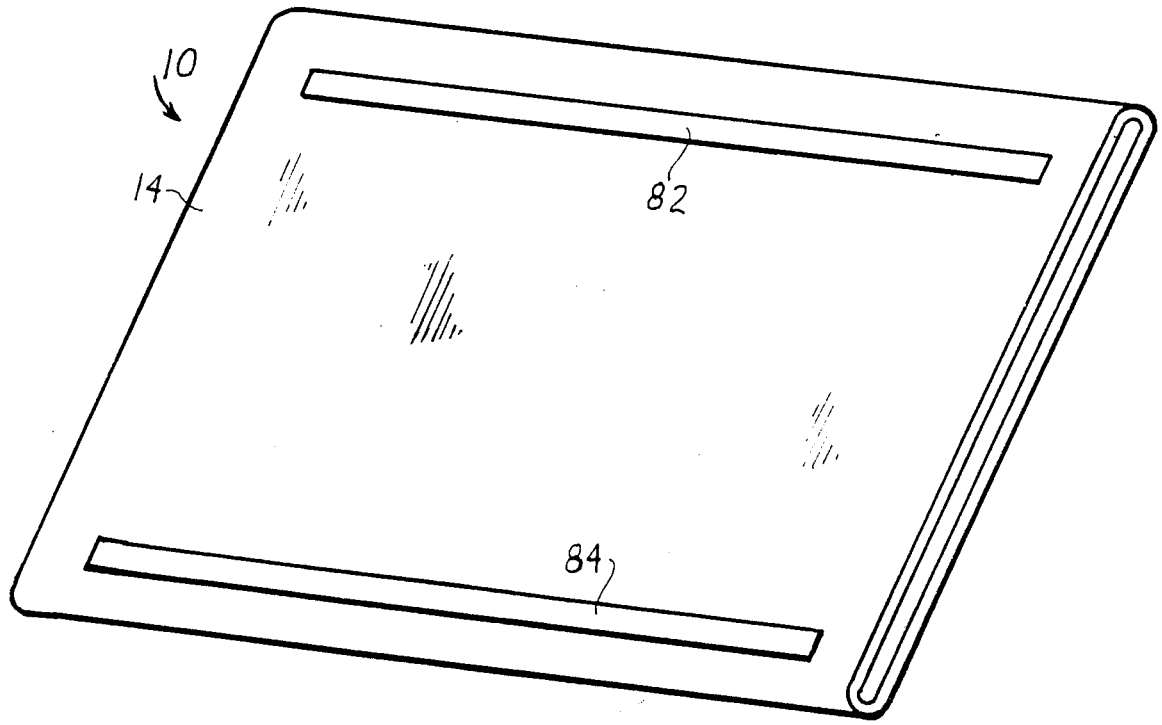
FIG. 8 is a bottom perspective view of the reversible pad unit with adhesive tape securing means.

FIG. 8 illustrates to bottom side of the reversible bag unit 10 showing the adhesive strips 82 and 84 affixed to the impermeable plastic liner 14. The adhesive strips 82 and 84 are used to secure the reversible bag unit 10 to the bottom and sides of the selected container. The placement of the adhesive strips 82 and 84 illustrated herein is only one of many variations on securing means and placement thereof which are disclosed further in co-pending application.

What is claimed is:

1. In the combination of sorbent pad laminate means for the collection of animal urine comprising:
   (a) a bottom layer of moisture impermeable material,
   (b) an intermediate sorbent layer of material having a high sorbtion capacity for urine, and
   (c) a top claw resistant screen means, said screen means being a urine permeable, claw resistant, urine inert flexible member capable of protecting said moisture impermeable material from being torn by claws, said first sheet layer of moisture impermeable material and said claw resistant screen means being bonded to each other along at least a substantial peripheral region of said screen means, the improvement comprising:
   said bottom layer of moisture impermeable material having a first sheet layer and a second sheet layer, said first sheet layer and said second sheet layer being peripherally sealed together to form a moisture impermeable bag like structure, whereby the bag-like structure is reversible.

2. The structure of claim 1, wherein said first sheet layer and said second sheet layer of moisture impermeable material are substantially equal in size.

3. The structure of claim 2, wherein said first sheet layer and said second sheet layer of moisture impermeable material each have an inner surface and an outer surface and are peripherally sealed together at all but one edge, with their inner surfaces in contact, to form said moisture impermeable bag like structure.

4. The structure of claim 3 wherein said first sheet and said second sheet layers have length and width dimensions substantially greater than that of said screen means.

5. The structure of claim 4 wherein said first sheet layer and said screen means are adhered together along at least a substantial portion of the peripheral edge of said screen means such that said screen means is substantially centered on the outer surface of said first sheet layer.

6. The structure of claim 5 wherein said moisture impermeable bag like structure, said sorbent layer and said claw resistant screen means are dimensioned relative to each other such that said moisture impermeable bag like structure is invertable about said sorbent layer and said claw resistant screen means.

7. The structure of claim 6 further comprising securing means, said securing means being affixed to the outer surface of said second sheet layer.

8. The structure of claim 7, wherein said securing means is a pressure sensitive adhesive.

9. The structure of claim 1, wherein said device further includes litter granules and wherein said litter granules overly said top claw resistant screen means.

10. The structure of claim 9 wherein said litter granules are substantially non-urine absorbent.

11. The structure of claim 1, wherein said sorbent pad laminate further comprises a layer of tissue paper between said sorbent means and said screen means.

12. In the combination of a litter device for use with cats and sorbent pad laminate means for the collection of animal urine, said sorbent pad laminate means comprising:
   (A) a bottom sheet layer of moisture impermeable material overlying the base of the device,
   (B) an intermediate sorbent layer of material having a high sorbtion capacity for urine,
   (C) top claw resistant screen means, said screen means being a urine permeable, flexible member of material which is substantially inert to urine, formed of strands bonded at their intersections and having sufficient tear strength to withstand the clawing action of a cat and sufficiently small hole size to protect said sorbent layer and said sheet layer of moisture impermeable material from being torn by animal claws, said moisture impermeable material and said claw resistant screen means being bonded to each other along at least a substantial portion of the screens periphery, and (D) a self supporting cat litter container having a base and walls, the improvement comprising said bottom layer of moisture impermeable material having a first sheet layer and a second sheet layer, said first sheet layer and said second sheet layer each having an inner surface and an outer surface and being peripherally sealed together at all but one edge, with their inner surfaces in contact, to form a moisture impermeable bag like structure, whereby the bag-like structure is reversible.

13. The structure of claim 12 wherein said outer surface of second sheet layer overlies the bottom and sides of said self supporting cat litter box.

14. The structure of claim 13 further comprising securing means, said securing means removably affixing said sorbent pad laminate means to said self supporting litter box and preventing relative movement between said sorbent pad and said self supporting structure which can be caused by the clawing action of an animal.

15. The structure of claim 14, wherein said securing means is a pressure sensitive adhesive.

16. The structure of claim 12, wherein said device further includes litter granules and wherein said litter granules overly said top claw resistant screen means.

17. The structure of claim 16 wherein said litter granules are substantially non-urine absorbent granules.

18. The method of disposing of a sorbent laminate litter pad for the collection of animal urine, said sorbent pad laminate including:

a bottom moisture impermeable material having a first sheet layer and a second sheet layer, each of said layers having an inner surface and an outer surface, said inner surfaces being in contact with each other, being substantially equal in size and peripherally bonded to one another at all but one side, an intermediate a sorbent layer of material having a high sorbtion capacity for urine, claw resistant screen means on the side of said intermediate sorbent layer opposite said bottom sheet layer of moisture impermeable material, litter granules overlying said claw resistant screen means, comprising the step of inverting said bottom moisture impermeable material causing said litter granules, screen means and sorbent layer means to be between said first moisture impermeable layer and said second moisture impermeable layer, thereby causing said outer surfaces of said first layer and said second layer to come in contact with each other and said inner surfaces of said first layer and said second layer to not be in contact with each other.

* * * * *